UNITED STATES PATENT OFFICE.

HUGO STOLTZENBERG, OF BRESLAU, GERMANY, ASSIGNOR TO THE FIRM OF MELASSE-SCHLEMPE, G. M. B. H., OF BERLIN, GERMANY.

NON-HYGROSCOPIC MANURE-STUFF AND PROCESS OF MAKING SAME.

1,104,326.     Specification of Letters Patent.     Patented July 21, 1914.

No Drawing.     Application filed July 7, 1913. Serial No. 777,769.

*To all whom it may concern:*

Be it known that I, HUGO STOLTZENBERG, doctor of chemistry, a subject of the King of Prussia and German Emperor, residing at 6 Friedensburgstrasse, in the city of Breslau, Germany, have invented certain new and useful Improvements in Non-Hygroscopic Manure-Stuff and Processes of Making Same, of which the following is a specification.

In the production of beet sugar, alcohol and wines, certain by-products are obtained as a waste material which in the case of beet sugar is termed " spent wash " or in the case of wines " vinasse." The masses possess similar characteristics and are known to have excellent properties as a fertilizer. Many attempts have been made to employ that mass, hereinafter generally referred to as vinasse, for fertilizing purposes by mixing the liquid mass after concentration with stuff having water binding properties, such as plaster of Paris and the like. All those attempts have failed up to the present on account of the vinasse containing large amounts of betain and other alkalis of a hygroscopic nature. For this reason the mixture of vinasse with solid matter rapidly attracts moisture and the mass ultimately deliquesces, so that it cannot be spread out by hand or by machines. I have now found that if the vinasse be mixed with phosphoric acid or acid phosphates and is afterward boiled down, the alkalis and betain combine with the phosphoric acid. While the mass is being heated a reaction sets in and both the water formed by the reaction and the organic acids set free can be distilled off. I have found that the phosphoric acid is most suitably applied in the shape of superphosphates, the gylcerin present in small proportions mechanically binding the whole mass. In this manner a fertilizer is produced that will keep for a long time. The fertilizer is non-hygroscopic and consequently can be well spread out. It also contains all the alkalis and soil-nutritious matter of the original beet root, because the reaction sets in at a low temperature, viz.—a little above 100° C. The acids liberated during the reaction can be condensed and employed for suitable purposes in a manner well-known.

As an example of the manner of preparing that fertilizer I mix 298 gr. superphosphate with 150 gr. of wash of a specific gravity 1.3771. The wet and sloppy mass is filled into a still and gradually heated above 100° C. The receiver connected with the still is cooled by cold water or some refrigerating mixture. After the reaction is terminated a residue is obtained in the still weighing about 442 gr. whereas the weight of the watery acids collected in the receiver was 45 gr. the acidity of which corresponded to 45.6 cc. of normal acid.

What I claim is:—

1. The process of producing a non-hygroscopic fertilizer consisting in treating vinasse with phosphoric acid, substantially as described.

2. The process of producing a non-hygroscopic fertilizer consisting in mixing vinasse preferably after previous concentration with an acid phosphate, substantially as described.

3. The process of producing a non-hygroscopic fertilizer consisting in mixing vinasse preferably after previous concentration with superphosphates, substantially as described.

4. The process of producing a non-hygroscopic fertilizer consisting in mixing vinasse preferably after previous concentration with an acid phosphate heating the mass until a reaction sets in and condensing the acids set free, substantially as described.

5. A non-hygroscopic fertilizer consisting of a compound of vinasse and superphosphates, substantially as described.

In testimony whereof I have affixed my signature in presence of two witnesses.

HUGO STOLTZENBERG.

Witnesses:
   LOUIS AKATZ,
   ERNST BLEISST.